United States Patent
Futa, Jr. et al.

(10) Patent No.: US 11,066,150 B2
(45) Date of Patent: Jul. 20, 2021

(54) PROPELLER OIL CONTROL SYSTEM FOR AIRCRAFT TURBOPROP ENGINES

(71) Applicant: HONEYWELL INTERNATIONAL INC., Morris Plains, NJ (US)

(72) Inventors: Paul W. Futa, Jr., North Liberty, IN (US); Sammuel Tillich, South Bend, IN (US); Steven Alan Lewis, South Bend, IN (US); Christopher Douglas Eick, Phoenix, AZ (US); Donald Striker, Chandler, AZ (US); Michael Albert McPherson, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 393 days.

(21) Appl. No.: 16/227,175

(22) Filed: Dec. 20, 2018

(65) Prior Publication Data
US 2020/0198765 A1  Jun. 25, 2020

(51) Int. Cl.
| | |
|---|---|
| *B64C 11/38* | (2006.01) |
| *B64C 11/44* | (2006.01) |
| *F02D 29/02* | (2006.01) |
| *B64C 11/40* | (2006.01) |
| *F02B 61/04* | (2006.01) |

(52) U.S. Cl.
CPC ............ *B64C 11/385* (2013.01); *B64C 11/40* (2013.01); *B64C 11/44* (2013.01); *F02B 61/04* (2013.01); *F02D 29/02* (2013.01); *F05D 2260/76* (2013.01)

(58) Field of Classification Search
CPC ....... B64C 11/38; B64C 11/385; B64C 11/44; B64C 27/64; F02B 61/04; F02D 29/02; F05D 2260/76
See application file for complete search history.

(56) References Cited

U.S. PATENT DOCUMENTS

| | | | |
|---|---|---|---|
| 5,174,718 A | 12/1992 | Lampeter et al. | |
| 6,059,528 A | 5/2000 | Danielson et al. | |
| 8,277,182 B2* | 10/2012 | Perkinson | ................. F01D 7/00 416/1 |
| 2013/0323050 A1* | 12/2013 | Kleckler | ............... B64C 11/385 416/1 |
| 2017/0361919 A1* | 12/2017 | Waddleton | ............ F04D 29/325 |
| 2018/0057146 A1 | 3/2018 | Futa, Jr. et al. | |
| 2019/0031319 A1* | 1/2019 | Calkins | ................... B64C 11/40 |

* cited by examiner

*Primary Examiner* — Courtney D Heinle
*Assistant Examiner* — Sang K Kim
(74) *Attorney, Agent, or Firm* — Lorenz & Kopf LLP (57) ABSTRACT

A propeller oil control system for a turboprop engine of an aircraft includes an engine control unit and a propeller oil controller. The engine control unit is operable to determine a flight phase of the aircraft and is configured to supply control commands. The propeller oil controller is coupled to receive a supply of oil and to discharge the oil at a discharge oil pressure. The propeller oil controller includes an electrohydraulic servo valve that receives the control commands moves to a plurality of positions between a first position and a mid-position, and a plurality of positions between the mid-position and a second position. The engine control unit only commands the electrohydraulic servo valve to move out of the first position when the engine control unit determines the aircraft is conducting a take-off roll or the aircraft is in flight.

20 Claims, 5 Drawing Sheets

PROPELLER OIL CONTROL SYSTEM FOR AIRCRAFT TURBOPROP ENGINES

TECHNICAL FIELD

The present invention generally relates to aircraft turboprop engines, and more particularly relates to a propeller oil control system for aircraft turboprop engines.

BACKGROUND

Some fixed-wing aircraft include one or more propeller blades driven by a gas turbine engine. Such aircraft may include a hydraulically actuated propeller pitch control actuation system that is configured to adjust and maintain a pitch of the propeller blades. Generally, the pitch of the propeller blades corresponds to an amount of thrust generated by the propeller blades.

Historically (e.g., for over fifty years), turboprop engine propeller pitch has been controlled using mechanical flyweight governors. Although generally robust, these mechanical governors do exhibit certain drawbacks. For example, these governors can exhibit relatively poor engine speed accuracy (e.g., engine speed drift due to oil temperature or airspeed), and engine speed control transient overshoots (due to lack of anticipation functionality and mechanical dynamics required for speed stability). In addition, engine speed control relies on relatively complex mechanical linkages to vary the speed set point of the governor. Additionally, these mechanical governors require routine maintenance to adjust speed set points.

Hence, there is a need for a propeller pitch control system that does not use mechanical flyweight governors, and thus exhibits greater engine speed accuracy, reduces the likelihood for engine speed control transient overshoots, does not rely on relatively complex mechanical linkages, and does not require the same amount of routine maintenance as conventional governors. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a propeller oil control system for a turboprop engine of an aircraft includes an engine control unit and a propeller oil controller. The engine control unit is operable to determine a flight phase of the aircraft and is configured to supply control commands. The propeller oil controller is coupled to receive a supply of oil and to discharge the oil at a discharge oil pressure. The propeller oil controller is further coupled to receive the control commands from the engine control unit and is configured, in response to the control commands, to control the discharge oil pressure. The propeller oil controller includes a housing, an oil pump, a pressure regulating valve, and an electrohydraulic servo valve. The housing includes a pump inlet port, a negative torque system supply outlet port, a drain pressure outlet port, and a control pressure outlet port. The oil pump is rotationally disposed within the housing and includes a pump inlet and a pump outlet. The oil pump is adapted to receive a drive torque and is configured, upon receipt of the drive torque, to draw oil into the pump inlet and discharge pressurized oil out of the pump outlet at a pump discharge pressure. The pressure regulating valve is disposed within the housing and is configured to regulate the pump discharge pressure. The electrohydraulic servo valve is coupled to the housing and includes at least a regulated oil inlet port, a drain pressure oil outlet port, and a valve outlet port. The regulated oil inlet port is in fluid communication with the pressure regulating valve to thereby receive the pressurized oil at the regulated pump discharge pressure. The valve outlet port is in fluid communication with the control pressure outlet port. The electrohydraulic servo valve is further coupled to receive the control commands and is configured, in response thereto, to move to (i) a plurality of positions between a first position and a mid-position, and (ii) a plurality of positions between the mid-position and a second position. In the first position and in the plurality of positions between the first position and the mid-position, the regulated oil inlet port is in fluid communication with the control pressure outlet port via the valve outlet port. In the mid-position, the regulated oil inlet port is not in fluid communication with the control pressure outlet port. In the second position and in a plurality of positions between the second position and the mid-position, the drain pressure oil outlet port is in fluid communication with the control pressure outlet port. The engine control unit only commands the electrohydraulic servo valve to move out of the first position when the engine control unit determines the aircraft is conducting a take-off roll or the aircraft is in flight.

In another embodiment, a propeller oil control system for a turboprop engine of an aircraft includes an engine control unit and a propeller oil controller. The engine control unit is operable to determine a flight phase of the aircraft and is configured to supply control commands. The propeller oil controller is coupled to receive a supply of oil and to discharge the oil at a discharge oil pressure. The propeller oil controller is further coupled to receive the control commands from the engine control unit and is configured, in response to the control commands, to control the discharge oil pressure. The propeller oil controller includes a housing, an oil pump, a pressure relief valve, a pressure regulating valve, and an electrohydraulic servo valve. The housing includes a pump inlet port, a negative torque system supply outlet port, a drain pressure outlet port, and a control pressure outlet port. The oil pump is rotationally disposed within the housing and includes a pump inlet and a pump outlet. The oil pump is adapted to receive a drive torque and is configured, upon receipt of the drive torque, to draw oil into the pump inlet and discharge pressurized oil out of the pump outlet at a pump discharge pressure. The pressure relief valve is disposed between the pump inlet port and the pump outlet. The pressure relief valve is configured to place the pump outlet in fluid communication with the pump inlet port when pump discharge pressure reaches a predetermined pressure magnitude. The pressure regulating valve is disposed within the housing and is configured to regulate the pump discharge pressure. The electrohydraulic servo valve is coupled to the housing and includes at least a regulated oil inlet port, a drain pressure oil outlet port, a valve outlet port, and a null spring. The regulated oil inlet port is in fluid communication with the pressure regulating valve to thereby receive the pressurized oil at the regulated pump discharge pressure. The valve outlet port is in fluid communication with the control pressure outlet port. The electrohydraulic servo valve is further coupled to receive the control commands and is configured, in response thereto, to move to (i) a plurality of positions between a first position and a mid-position, and (ii) a plurality of positions between the mid-position and a second position. The null spring applies a force to the valve element that urges the valve element toward the first position. In the first position and in the plurality of positions between the first position and the mid-position, the regulated oil inlet port is in fluid communication with the control pressure outlet port via the valve outlet port. In the mid-position, the regulated oil inlet port is not in fluid communication with the control pressure outlet port. In the second position and in a plurality of positions between the second position and the mid-position, the drain pressure oil outlet port is in fluid communication with the control pressure outlet port. The engine control unit only commands the electrohydraulic servo valve to move out of the first position when the engine control unit determines the aircraft is conducting a take-off roll or the aircraft is in flight.

In yet another embodiment, a propeller oil control system for a turboprop engine of an aircraft includes an engine control unit and a propeller oil controller. The engine control unit is operable to determine a flight phase of the aircraft and is configured to supply control commands. The propeller oil controller is coupled to receive a supply of oil and to discharge the oil at a discharge oil pressure. The propeller oil controller is further coupled to receive the control commands from the engine control unit and is configured, in response to the control commands, to control the discharge oil pressure. The propeller oil controller includes a housing, a gerotor pump, a pressure relief valve, a pressure regulating valve, and an electrohydraulic servo valve. The housing includes a pump inlet port, a negative torque system supply outlet port, a drain pressure outlet port, and a control pressure outlet port. The oil pump is rotationally disposed within the housing and includes a pump inlet and a pump outlet. The gerotor pump is adapted to receive a drive torque and is configured, upon receipt of the drive torque, to draw oil into the pump inlet and discharge pressurized oil out of the pump outlet at a pump discharge pressure. The pressure relief valve is disposed between the pump inlet port and the pump outlet. The pressure relief valve is configured to place the pump outlet in fluid communication with the pump inlet port when pump discharge pressure reaches a predetermined pressure magnitude. The pressure regulating valve is disposed within the housing and is configured to regulate the pump discharge pressure. The electrohydraulic servo valve is coupled to the housing and includes at least a regulated oil inlet port, a drain pressure oil outlet port, a valve outlet port, and a null spring. The regulated oil inlet port is in fluid communication with the pressure regulating valve to thereby receive the pressurized oil at the regulated pump discharge pressure. The valve outlet port is in fluid communication with the control pressure outlet port. The electrohydraulic servo valve is further coupled to receive the control commands and is configured, in response thereto, to move to (i) a plurality of positions between a first position and a mid-position, and (ii) a plurality of positions between the mid-position and a second position. The null spring applies a force to the valve element that urges the valve element toward the first position. In the first position and in the plurality of positions between the first position and the mid-position, the regulated oil inlet port is in fluid communication with the control pressure outlet port via the valve outlet port. In the mid-position, the regulated oil inlet port is not in fluid communication with the control pressure outlet port. In the second position and in a plurality of positions between the second position and the mid-position, the drain pressure oil outlet port is in fluid communication with the control pressure outlet port. The engine control unit only commands the electrohydraulic servo valve to move out of the first position when the engine control unit determines the aircraft is conducting a take-off roll or the aircraft is in flight.

Furthermore, other desirable features and characteristics of the propeller oil control unit will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
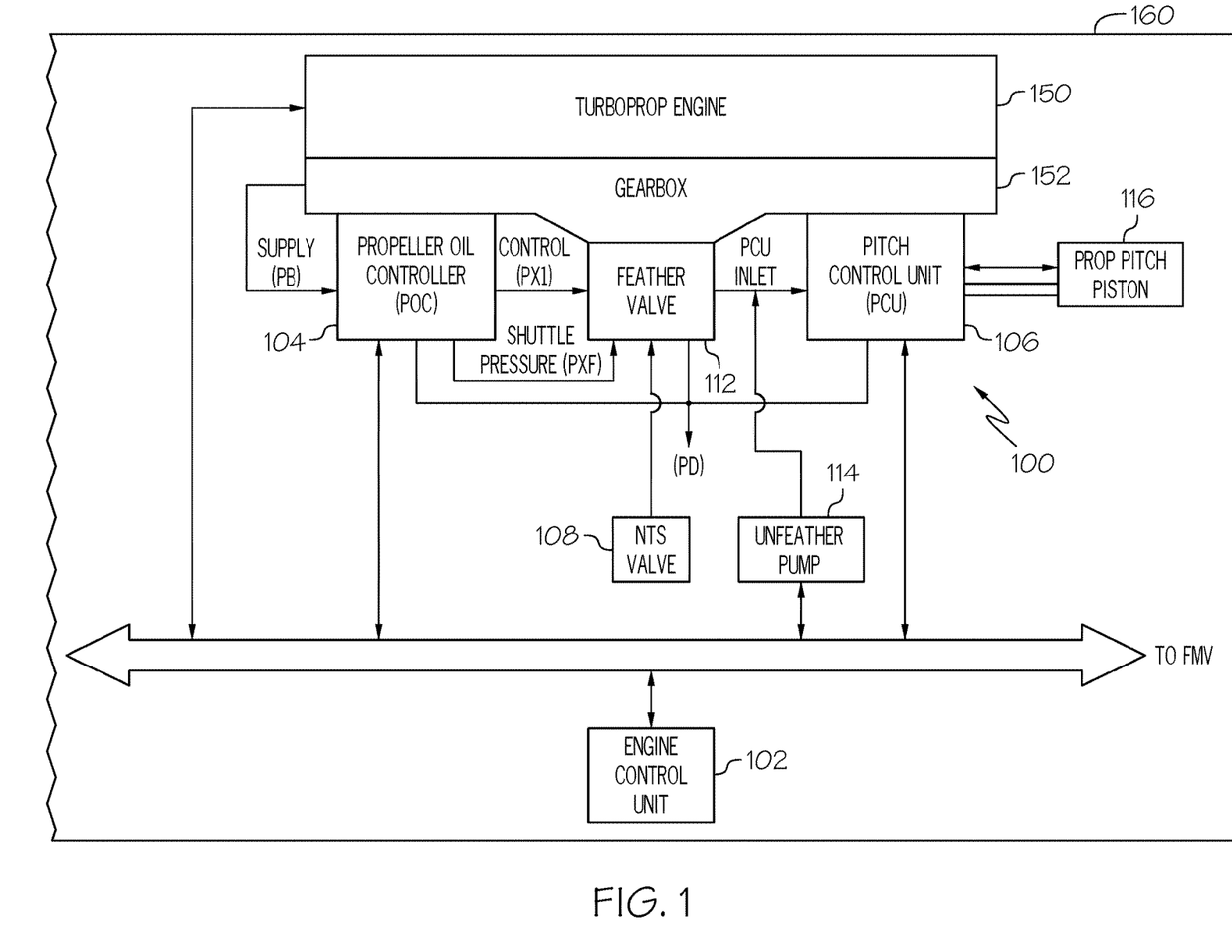
FIG. 1 depicts a functional block diagram of one embodiment of a propeller pitch control system.

Referring first to FIG. 1, a functional block diagram of one embodiment of a turboprop engine propeller pitch control system 100 is depicted. The depicted system 100, which is used in conjunction with a turboprop engine 150 that is mounted on an aircraft 160, includes at least an engine control unit 102, a propeller oil controller 104, and a pitch control unit 106. As FIG. 1 further depicts, the system 100, or at least portions thereof, may be mounted on or within the gearbox 152 of the turboprop engine 150. The depicted system 100 may also include a negative torque sensor valve 108, a feather valve 112, and an unfeather pump 114. For completeness, a brief description of these additional, optional components and associated functions will be described further below.

The engine control unit 102 is in operable communication with the propeller oil controller 104 and the pitch control unit 106, and it is also in operable communication with the turboprop engine 150. The engine control unit 102 may be implemented as any one of numerous types of engine control units such as, for example, an electronic engine controller (EEC) or a full-authority digital engine controller (FADEC). Regardless of how it is specifically implemented, the engine control unit 102 is configured to implement control and monitoring of the turboprop engine 150. In particular, the engine control unit 102 controls fuel flow to the turboprop engine 150, via a non-illustrated fuel metering valve (FMV), to thereby control engine power generation. The engine control unit 102 simultaneously supplies control commands to, and thus controls the operations of, both the propeller oil controller 104 and the pitch control unit 106 to thereby control engine rotational speed.

The propeller oil controller 104 is coupled to receive a supply of oil at a supply pressure (PB) and is configured to discharge the oil at a discharge oil pressure (PX1). The supply of oil may come from any one of numerous sources, but in the depicted embodiment the source is the engine gearbox 152. The propeller oil controller 104 is further coupled to receive control commands from the engine control unit 102 and is configured, in response to the control commands, to control the discharge oil pressure (PX1).

The propeller pitch control unit 106 is coupled to receive the pressurized oil discharged from the propeller oil control unit 104. The propeller pitch control unit 106 is also coupled to receive control commands from the engine control unit 102. The propeller pitch control unit 106 is configured, in response to the control commands it receives, to control the position of a non-illustrated beta piston, which in turn controls the position of a propeller pitch piston 116, and thus propeller blade angle.

The rotational speed and power of the turboprop engine 150 are based, at least in part, on pilot commanded speed and power lever angle (PLA). The engine control unit 102 receives and processes the pilot commanded speed and PLA, together with various additional inputs and, in response to these inputs, generates the commands that control fuel flow, the propeller oil controller 104, and the propeller pitch control unit 106, to produce the requested engine speed and power. Although the various additional inputs may vary, in the depicted embodiments these inputs include, for example fuel metering valve position, engine speed, various pressures, and pitch control unit position.

The engine control unit 102 is also operable to determine a flight phase of the aircraft 160 and is configured to supply the control commands to the propeller oil controller 104 and to the pitch control unit 106 based at least in part on the determined phase of flight. Specifically, when the engine control unit 102 determines the aircraft is conducting specific ground operations, such as pre-takeoff roll taxiing operations or post-landing touchdown operations, the propeller oil controller 104 is commanded by the engine control unit 102 to supply pressurized fluid (e.g., oil) to the pitch control unit 106. The pitch control unit 106 is in turn commanded by the engine control unit 102 to modulate fluid flow to control the position of a propeller pitch piston 116, and thus the propeller blade angle. When the engine control unit 102 determines the aircraft is either conducting a take-off roll or is in flight, the pitch control unit 106 is basically inactive, providing only a minimum propeller pitch stop. However, the propeller oil controller 104 is commanded by the engine control unit 102 to modulate fluid flow to control the position of a propeller pitch piston 116, and thus the propeller blade angle.

The propeller oil controller 104 and the pitch control unit 106 may be variously configured to implement the above-described functions. One particular embodiment of the propeller oil controller 104 will be described momentarily. Before doing so, however, a brief description of the previously mentioned additional, optional components—the negative torque sensor valve 108, the feather valve 112, and the unfeather pump 114—and associated functions will first be provided.

The negative torque sensor valve 108, when included, is a hydro-mechanically controlled valve that senses negative torque of the propeller. Should unintended negative torque occur, the negative torque sensor valve 108, in conjunction with a non-illustrated orifice pack, will position the feather valve 112 to block the output pressure of the propeller oil controller 104 (PX1) and reduce the PCU inlet pressure by venting it to drain pressure (PD). As a result, propeller pitch is moved to an increased forward thrust angle, thereby eliminating unintended negative propeller blade torque.

The feather valve 112, when included, is disposed between the propeller oil controller 104 and the pitch control unit 106 and, as just described, can be positioned in response to the negative torque sensor valve 108. As will be briefly mentioned further below, the feather valve 112 can also be positioned independently of the negative torque sensor valve 108, via commands from the pilot, to vent the output pressure of the propeller oil controller 104 (PX1) to drain pressure (PD). This allows the pilot to controllably increase the propeller pitch to a greater forward thrust angle and, if needed, all the way to a feather pitch angle. As is generally known, feather pitch aligns the blade pitch to the direction of flight, so the blade will produce minimal drag if the engine 150 is shut down in flight.

The unfeather pump 114 is only activated and operated when the engine 150 is not running. When activated, the unfeather pump 114 supplies pressurized fluid (e.g., oil) to the system 100 to build up the system fluid pressures. Though not depicted in FIG. 1, the fluid discharged from the unfeather pump 114 preferably passes through a check valve. This prevents the backflow of pressurized fluid through the pump 114 when it is not in operation.

Having described the overall system 100, including the additional, optional components, one embodiment of the propeller oil controller 104 will now be described. In doing so, reference should now be made to FIG. 2, which depicts a schematic representation of one embodiment of a propeller oil controller 104. The depicted propeller oil controller 104 includes at least a housing 202, an oil pump 204, a pressure regulating valve 206, and an electrohydraulic servo valve (EHSV) 208. The housing 202 includes a pump inlet port 212, a negative torque system outlet port 214, a feather valve outlet port 215, a drain pressure outlet port 216, and a control pressure outlet port 240.

Figure 2:
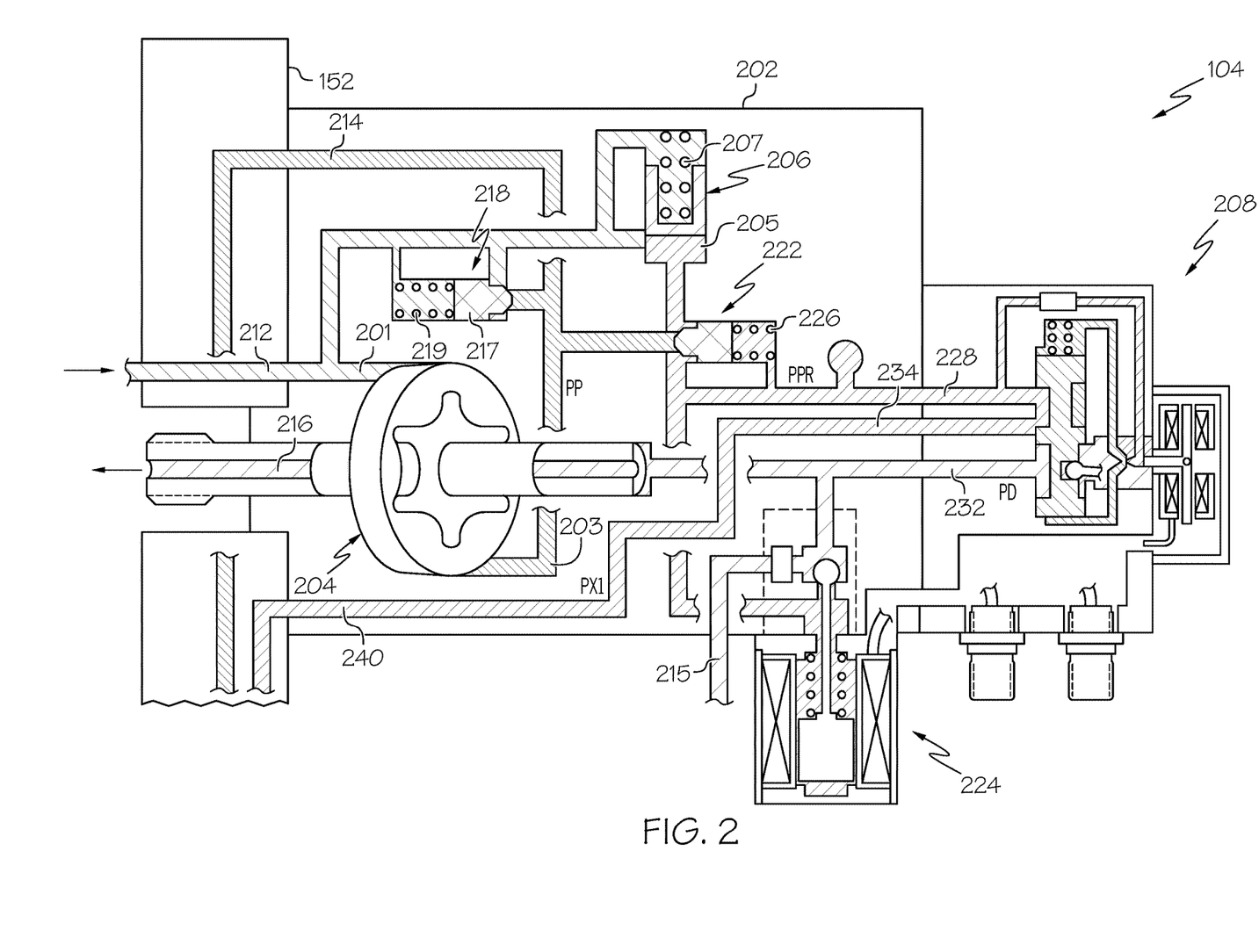
FIG. 2 depicts a schematic representation of one embodiment of a propeller oil controller that may be used to implement the propeller pitch control system depicted in FIG. 1.

The oil pump 204 is rotationally disposed within the housing 202 and is coupled to receive a drive torque. In the depicted embodiment, the drive torque is supplied from the engine 150, via the engine gearbox 152. In other embodiments, the drive torque may be supplied from any one of numerous other sources, such as electric, hydraulic, or pneumatic motors. The oil pump 204 includes a pump inlet 201 and a pump outlet 203 and is configured, upon receipt of the drive torque, to draw oil into the pump inlet 201, via the pump inlet port 212, and discharge pressurized oil, at a pump discharge pressure (PP), from the pump outlet 203. A small portion of the pressurized oil is supplied to the negative torque system outlet port 214 and the remainder is supplied to a check valve 222. It will be appreciated that the oil pump 204 may be implemented using any one of numerous types of positive displacement pumps. In the depicted embodiment, the oil pump 204 is implemented as a gerotor pump, but could also be implemented as a gear pump.

The pressure regulating valve 206 is disposed within the housing 202 and is configured to regulate the pump discharge pressure. The pressure regulating valve 206 may be variously configured and implemented, but in the depicted embodiment it is implemented using a single-stage regulator that includes a valve element 205 and a load spring 207. As is generally known, the valve element 205 and load spring 207 work together to regulate the pump discharge pressure (PP) to a predetermined pressure magnitude (PPR).

Before describing the EHSV 208 in more detail, it is noted that the propeller oil controller 104 may include one or more additional components. For example, the depicted propeller oil controller 104 further includes a pressure relief valve 218, the above-mentioned check valve 222, and a full feather valve control assembly 224. In some embodiments, the propeller oil controller 104 may be implemented without any of these components. In other embodiments, such as the one depicted in FIG. 3, the propeller oil controller 104 includes the check valve 222 but does not include the full feather valve control assembly 224, and the pressure relief valve 218 is disposed within the pressure regulating valve 206. For completeness, a brief description of embodiments of the pressure relief valve 218 and the check valve 222 will be provided. Before doing so, however, it is noted that the full feather valve control assembly 224 is used, as alluded to above, to position the the feather valve 112 independently of the negative torque sensor valve 108. A description of the full feather valve control assembly 224 is not needed to understand or implement the functionality of the propeller oil controller 104 and will thus not be provided.

The pressure relief valve 218 is disposed between the pump inlet port 212 and the negative torque system outlet port 214 and is configured, when pump discharge pressure reaches a predetermined pressure magnitude, to place the pump outlet 203 in fluid communication with the pump inlet port 212. In the embodiment depicted in FIG. 2, the pressure relief valve 218 includes a valve element 217 and a spring 219, and it is implemented separate from the pressure regulating valve 206.

Figure 3:
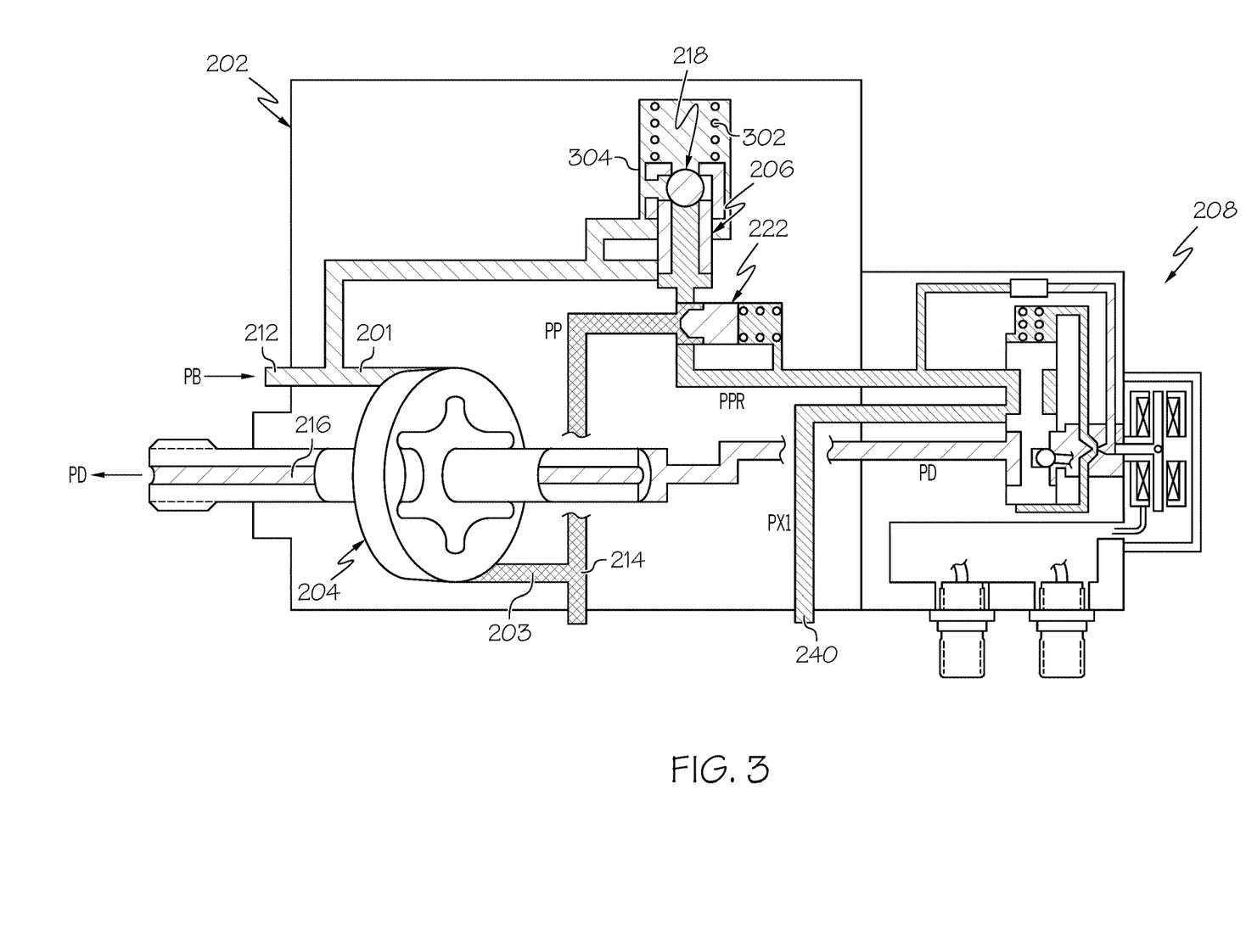
FIG. 3 depicts a schematic representation of one embodiment of a propeller oil controller that may be used to implement the propeller pitch control system depicted in FIG. 1.

In the embodiment depicted in FIG. 3, the pressure relief valve 218 is disposed within the pressure regulating valve 206. In this embodiment, the pressure regulating valve 206 and the pressure relief valve 218 share a common spring 302 and are disposed within a common valve body 304. The functions of the two valves 206, 218 remain the same. It may be readily understood that the pressure regulating valve 206 and the pressure relief valve 218 move simultaneously to regulate pump discharge pressure to the predetermined pressure magnitude (PPR). However, in the unlikely event that the pressure regulating valve 206 were to seize in the shut position and the pump discharge pressure reaches the predetermined pressure magnitude, the pressure relief valve 218 moves independently of the pressure regulating valve 206 to place the pump outlet 203 in fluid communication with the pump inlet port 212.

Returning now to FIG. 2, it is seen that the check valve 222 is disposed between the pump outlet 203 and the pressure regulating valve 206. The check valve 222 is movable between an open position and a closed position. In the open position, the pump outlet 203 is in fluid communication with the pressure regulating valve 206. In the closed position, the pump outlet 203 is not in fluid communication with the pressure regulating valve 206. As FIG. 2 also depicts, a check valve bias spring 226 may be included. When included, the check valve bias spring 226 supplies a bias force to the check valve 222 that urges the check valve 222 toward the closed position.

Turning now to a description of the EHSV 208, the EHSV 208 is coupled to the housing 202 and includes at least a regulated oil inlet port 228, a drain pressure oil outlet port 232, and a valve outlet port 234. The regulated oil inlet port 228 is in fluid communication with the pressure regulating valve 206 and the pump outlet 203 to thereby receive the pressurized oil at the regulated pump discharge pressure (PPR). The valve outlet port 234 is in fluid communication with the control pressure outlet port 240. The EHSV 208 is coupled to receive the control commands supplied from the engine control unit 102 and is configured, in response to the control commands, to move to between a first position and a second position.

More specifically, the EHSV 208 is configured, in response to the control commands, to move to a plurality of positions between the first position and a mid-position, and to a plurality of positions between the mid-position and the second position. In the first position, which is the position depicted in FIG. 2, and in the plurality of positions between the first position and the mid-position, the regulated oil inlet port 228 is in fluid communication with the control pressure outlet port 240 via the valve outlet port 234. In the mid-position, which is the position depicted in FIG. 4, the regulated oil inlet port 228 is not in fluid communication with the valve outlet port 234, and thus not in fluid communication with the control pressure outlet port 240. In the second position, which is the position depicted in FIG. 5, and in a plurality of positions between the second position and the mid-position, the drain pressure oil outlet port 232 is in fluid communication with the control pressure outlet port 240 via the valve outlet port 234.

It may thus be appreciated that the discharge oil pressure (PX1) may be modulated by moving the EHSV 208 out of the first position. As was previously noted, the engine control unit 102 only commands the propeller oil controller 104 to modulate discharge oil pressure (PX1) when the engine control unit 102 determines that the aircraft 160 is conducting a take-off roll or is in flight. Thus, as may be appreciated, the engine control unit 102 only commands the EHSV 208 to move out of the first position when the engine control unit 102 determines the aircraft 160 is conducting a take-off roll or is in flight.

The EHSV 208 may be variously configured to its functionality. In the depicted embodiment, and as shown more clearly in FIG. 4, the EHSV 208 includes a valve body 236, a valve element 238, a first control conduit 242, a second control conduit 244, a control nozzle 246, and a control element 248. The valve body 236 includes the regulated oil inlet port 228, the drain pressure oil outlet port 232, and the valve outlet port 234. The valve body 236 additionally includes a drain pressure chamber 252 and an inner surface that defines a valve element chamber 254. The valve element chamber 254 includes a first control chamber 256 and a second control chamber 258.

Figure 4:
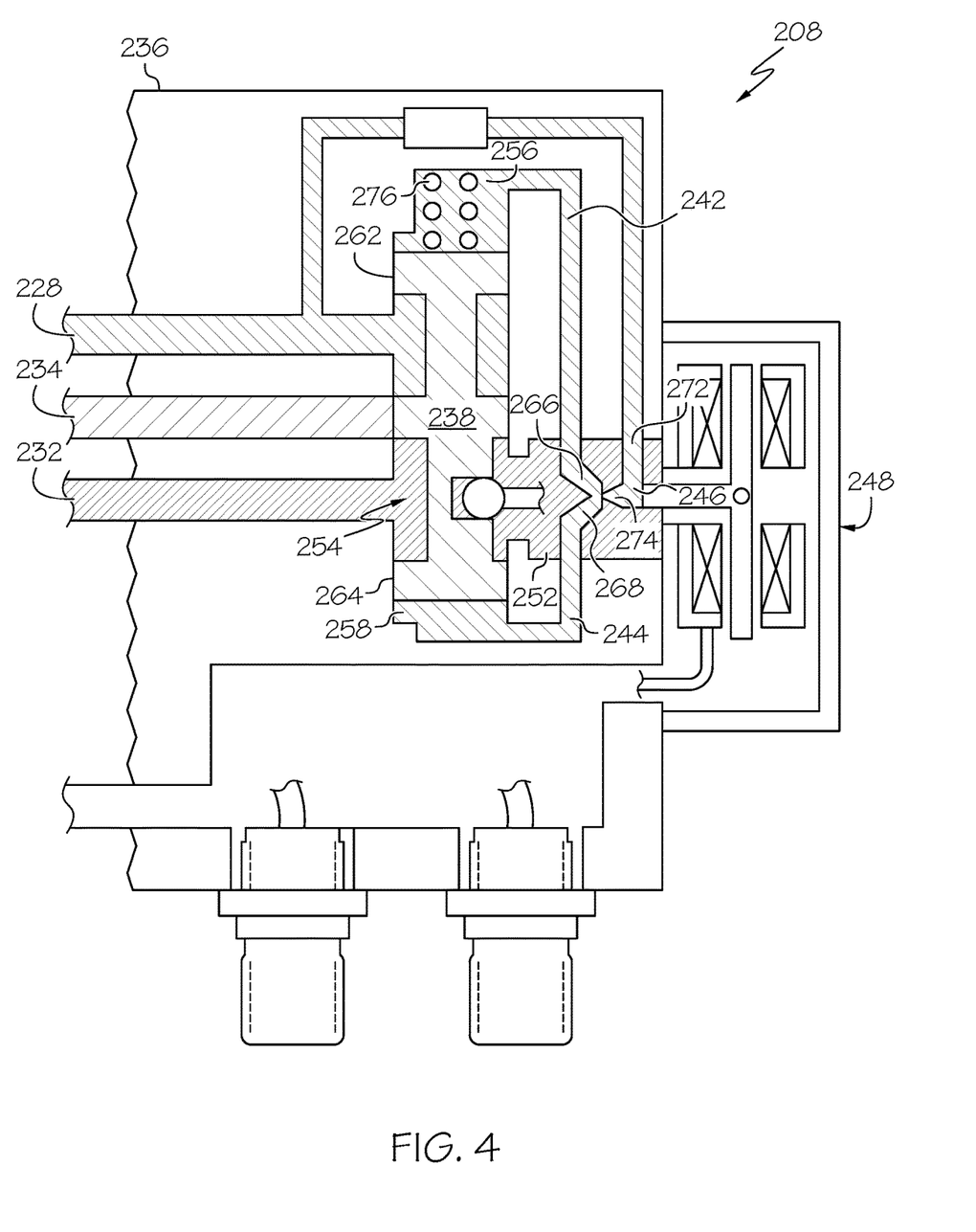
FIGS. 4 and 5 depict a schematic representation of one embodiment of an electrohydraulic servo valve that may be used to implement the propeller oil controllers depicted in FIGS. 2 and 3.
Figure 5:
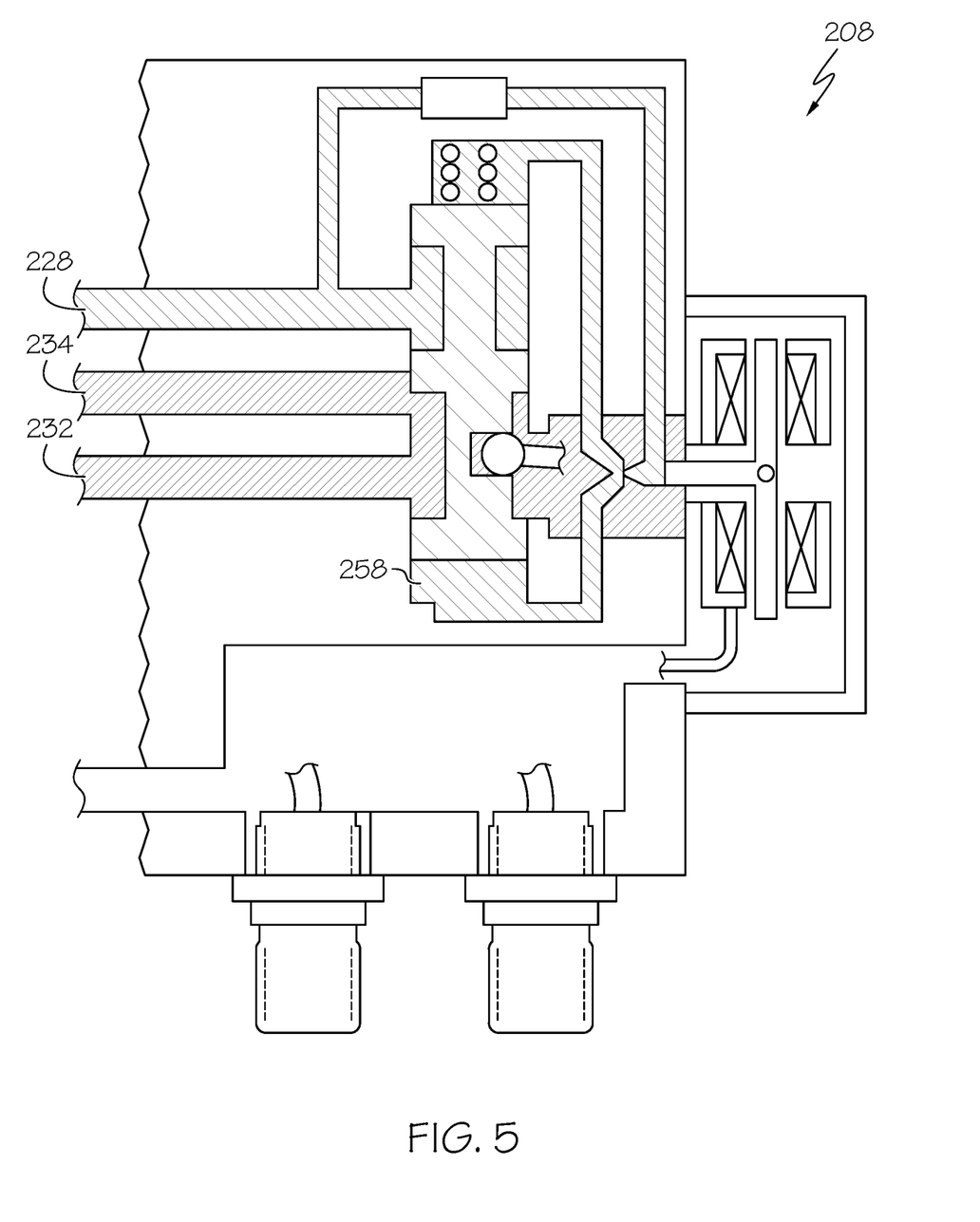

The valve element 238 is disposed within the valve element chamber 254 and is movable therein to the plurality of positions between the first position, the mid-position, and the second position. The valve element 238 includes a first end 262, which is disposed within the first control chamber 256, and a second end 264, which is disposed within the second control chamber 258.

The first control conduit 242 is defined in the valve body 236 and has a first control port 266 disposed within the drain pressure chamber 252, and the second control conduit 244 is defined in the valve body 236 and has a second control port 268 disposed within the drain pressure chamber 252. The first control conduit 242 fluidly communicates the drain pressure chamber 252 with the first control chamber 256, and the second control conduit 244 fluidly communicates the drain pressure chamber 252 with the second control chamber 258.

The control nozzle 246 has an inlet port 272 and an outlet port 274. The inlet port 272 is in fluid communication with the regulated oil inlet port 228. The outlet port 274 is disposed in the drain pressure chamber 252, adjacent to the first control port 266 and the second control port 268. The control nozzle 246 is moveable within the drain pressure chamber 252 to control pressure in the first 242 and second 244 control conduits to thereby control pressure in the first 256 and second 258 control chambers, respectively, whereby movement of the valve element 238 is controlled.

The control element 248 is coupled to the control nozzle 246. The control element 248 is responsive the control commands received from the engine control unit 102 to move the control nozzle 246, and thus control the position of the valve element 238. It will be appreciated that the control element 248 may be variously configured to implement its functionality. In the depicted embodiment, however, the control element 248 is implemented using a torque motor, and more specifically, using a dual-channel torque motor.

The depicted EHSV 208 additionally includes a null spring 276. The null spring 276 is disposed within the first control chamber 256 and applies a force to the valve element 238 that urges the valve element 238 toward the first position in the absence of regulated pressure being supplied to the regulated oil inlet port 228, such as when the turboprop engine 150 is shutdown. The valve element 238 needs to be positioned in the first position when the above-described feather pump is operating to ensure that the control pressure outlet port 240 is isolated from drain pressure oil outlet port 216.

The propeller oil controller described herein allows for a propeller pitch control system that does not use mechanical flyweight governors, and thus exhibits greater engine speed accuracy, reduces the likelihood for engine speed control transient overshoots, does not rely on relatively complex mechanical linkages, and does not require the same amount of routine maintenance as conventional governors.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A propeller oil control system for a turboprop engine of an aircraft, comprising:
    an engine control unit operable to determine a flight phase of the aircraft and configured to supply control commands; and
    a propeller oil controller coupled to receive a supply of oil and discharge the oil at a discharge oil pressure, the propeller oil controller further coupled to receive the control commands from the engine control unit and configured, in response to the control commands, to control the discharge oil pressure, the propeller oil controller comprising:
        a housing including a pump inlet port, a negative torque system supply outlet port, a drain pressure outlet port, and a control pressure outlet port;
        an oil pump rotationally disposed within the housing, the oil pump including a pump inlet and a pump outlet, the oil pump adapted to receive a drive torque and configured, upon receipt of the drive torque, to draw oil into the pump inlet and discharge pressurized oil out of the pump outlet at a pump discharge pressure;
        a pressure regulating valve disposed within the housing and configured to regulate the pump discharge pressure; and
        an electrohydraulic servo valve coupled to the housing and including at least a regulated oil inlet port, a drain pressure oil outlet port, and a valve outlet port, the regulated oil inlet port in fluid communication with the pressure regulating valve to thereby receive the pressurized oil at the regulated pump discharge pressure, the valve outlet port in fluid communication with the control pressure outlet port, the electrohydraulic servo valve further coupled to receive the control commands and configured, in response thereto, to move to (i) a plurality of positions between a first position and a mid-position, and (ii) a plurality of positions between the mid-position and a second position,
        wherein:
            in the first position and in the plurality of positions between the first position and the mid-position, the regulated oil inlet port is in fluid communication with the control pressure outlet port via the valve outlet port,
            in the mid-position, the regulated oil inlet port is not in fluid communication with the control pressure outlet port,
            in the second position and in a plurality of positions between the second position and the mid-position, the drain pressure oil outlet port is in fluid communication with the control pressure outlet port, and
            the engine control unit only commands the electrohydraulic servo valve to move out of the first position when the engine control unit determines the aircraft is conducting a take-off roll or the aircraft is in flight.

2. The propeller oil control system of claim 1, further comprising:
a pressure relief valve disposed between the pump inlet port and the negative torque system supply outlet port, the pressure relief valve configured to place the pump outlet in fluid communication with the pump inlet port when pump discharge pressure reaches a predetermined pressure magnitude.

3. The propeller oil control system of claim 2, wherein the pressure relief valve is disposed within the pressure regulating valve.

4. The propeller oil control system of claim 1, wherein the electrohydraulic servo valve further comprises a null spring, the null spring applying a force to the valve element that urges the valve element toward the first position.

5. The propeller oil control system of claim 4, wherein the electrohydraulic servo valve comprises:
a valve body including the regulated oil inlet port, the drain pressure oil outlet port, the valve outlet port, the valve body further including a drain pressure chamber, and an inner surface that defines a valve element chamber, the valve element chamber including a first control chamber and a second control chamber;
a valve element disposed within the valve element chamber and movable to the plurality of positions between the first position, the mid-position, and the second position, the valve element including a first end and a second end, the first end disposed within the first control chamber, the second end disposed within the second control chamber;
a first control conduit defined in the valve body and having a first control port disposed within the drain pressure chamber, the first control conduit fluidly communicating the drain pressure chamber with the first control chamber;
a second control conduit defined in the valve body and having a second control port disposed within the drain pressure chamber, the second control conduit fluidly communicating the drain pressure chamber with the second control chamber;
a control nozzle having an inlet port and an outlet port, the inlet port in fluid communication with the regulated oil inlet port, the outlet port disposed in the drain pressure chamber and adjacent to the first control port and the second control port, the control nozzle moveable within the drain pressure chamber to control pressure in the first and second control conduits to thereby control pressure in the first and second control chambers, respectively, whereby movement of the valve element is controlled; and
a control element coupled to the control nozzle, the control element further coupled to receive the control commands and configured, in response thereto, to move the control nozzle.

6. The propeller oil control system of claim 5, wherein the control element comprises a torque motor.

7. The propeller oil control system of claim 5, wherein the null spring is disposed within the first control chamber.

8. The propeller oil control system of claim 1, wherein the oil pump comprises a gerotor pump.

9. The propeller oil control system of claim 1, further comprising:
a check valve disposed between the pump outlet and the regulated oil inlet port, the check valve movable between an open position, in which the regulated oil inlet port is in fluid communication with the pressure regulating valve, and a closed position, in which the regulated oil inlet port is not in fluid communication with the pressure regulating valve.

10. The propeller oil control system of claim 9, further comprising:
a check valve bias spring that supplies a bias force to the check valve that urges the check valve toward the closed position.

11. The propeller oil control system of claim 5, wherein:
the control element comprises a torque motor; and
the null spring is disposed within the first control chamber.

12. The propeller oil control system of claim 1, wherein the oil pump comprises a gerotor pump.

13. The propeller oil control system of claim 1, further comprising:
a check valve disposed between the pump outlet and the regulated oil inlet port, the check valve movable between an open position, in which the regulated oil inlet port is in fluid communication with the pressure regulating valve, and a closed position, in which the regulated oil inlet port is not in fluid communication with the pressure regulating valve; and
a check valve bias spring that supplies a bias force to the check valve that urges the check valve toward the closed position.

14. A propeller oil control system for a turboprop engine of an aircraft, comprising:
an engine control unit operable to determine a flight phase of the aircraft and configured to supply control commands; and
a propeller oil controller coupled to receive a supply of oil and discharge the oil at a discharge oil pressure, the propeller oil controller further coupled to receive the control commands from the engine control unit and configured, in response to the control commands, to control the discharge oil pressure, the propeller oil controller comprising:
a housing including a pump inlet port, a negative torque system supply outlet port, a drain pressure outlet port, and a control pressure outlet port;
an oil pump rotationally disposed within the housing, the oil pump including a pump inlet and a pump outlet, the oil pump adapted to receive a drive torque and configured, upon receipt of the drive torque, to draw oil into the pump inlet and discharge pressurized oil out of the pump outlet at a pump discharge pressure;
a pressure relief valve disposed between the pump inlet port and the pump outlet, the pressure relief valve configured to place the pump outlet in fluid communication with the pump inlet port when pump discharge pressure reaches a predetermined pressure magnitude;
a pressure regulating valve disposed within the housing and configured to regulate the pump discharge pressure; and
an electrohydraulic servo valve coupled to the housing and including at least a regulated oil inlet port, a drain pressure oil outlet port, a valve outlet port, and a null spring, the regulated oil inlet port in fluid communication with the pressure regulating valve to thereby receive the pressurized oil at the regulated pump discharge pressure, the valve outlet port in fluid communication with the control pressure outlet port, the electrohydraulic servo valve further coupled to receive the control commands and configured, in response thereto, to move to (i) a plurality of positions between a first position and a mid-position, and (ii) a plurality of positions between the mid-position and a second position, wherein:
the null spring applies a force to the valve element that urges the valve element toward the first position, in the first position and in the plurality of positions between the first position and the mid-position, the regulated oil inlet port is in fluid communication with the control pressure outlet port via the valve outlet port, in the mid-position, the regulated oil inlet port is not in fluid communication with the control pressure outlet port, in the second position and in a plurality of positions between the second position and the mid-position, the drain pressure oil outlet port is in fluid communication with the control pressure outlet port, and the engine control unit only commands the electrohydraulic servo valve to move out of the first position when the engine control unit determines the aircraft is conducting a take-off roll or the aircraft is in flight.

15. The propeller oil control system of claim 14, wherein the pressure relief valve is disposed within the pressure regulating valve.

16. The propeller oil control system of claim 14, wherein the electrohydraulic servo valve comprises:
a valve body including the regulated oil inlet port, the drain pressure oil outlet port, the valve outlet port, the valve body further including a drain pressure chamber, and an inner surface that defines a valve element chamber, the valve element chamber including a first control chamber and a second control chamber;
a valve element disposed within the valve element chamber and movable to the plurality of positions between the first position, the mid-position, and the second position, the valve element including a first end and a second end, the first end disposed within the first control chamber, the second end disposed within the second control chamber;
a first control conduit defined in the valve body and having a first control port disposed within the drain pressure chamber, the first control conduit fluidly communicating the drain pressure chamber with the first control chamber;
a second control conduit defined in the valve body and having a second control port disposed within the drain pressure chamber, the second control conduit fluidly communicating the drain pressure chamber with the second control chamber;
a control nozzle having an inlet port and an outlet port, the inlet port in fluid communication with the regulated oil inlet port, the outlet port disposed in the drain pressure chamber and adjacent to the first control port and the second control port, the control nozzle moveable within the drain pressure chamber to control pressure in the first and second control conduits to thereby control pressure in the first and second control chambers, respectively, whereby movement of the valve element is controlled; and a control element coupled to the control nozzle, the control element further coupled to receive the control commands and configured, in response thereto, to move the control nozzle.

17. The propeller oil control system of claim 14, wherein the pressure relief valve is disposed within the pressure regulating valve.

18. The propeller oil control system of claim 14, wherein the electrohydraulic servo valve is implemented using a dual-channel, two-stage, three-way electrohydraulic servo valve comprising:
a valve body including the regulated oil inlet port, the drain pressure oil outlet port, the valve outlet port, the valve body further including a drain pressure chamber, and an inner surface that defines a valve element chamber, the valve element chamber including a first control chamber and a second control chamber, the first control chamber having the null spring disposed therein;
a valve element disposed within the valve element chamber and movable to the plurality of positions between the first position, the mid-position, and the second position, the valve element including a first end and a second end, the first end disposed within the first control chamber, the second end disposed within the second control chamber;
a first control conduit defined in the valve body and having a first control port disposed within the drain pressure chamber, the first control conduit fluidly communicating the drain pressure chamber with the first control chamber;
a second control conduit defined in the valve body and having a second control port disposed within the drain pressure chamber, the second control conduit fluidly communicating the drain pressure chamber with the second control chamber;
a control nozzle having an inlet port and an outlet port, the inlet port in fluid communication with the regulated oil inlet port, the outlet port disposed in the drain pressure chamber and adjacent to the first control port and the second control port, the control nozzle moveable within the drain pressure chamber to control pressure in the first and second control conduits to thereby control pressure in the first and second control chambers, respectively, whereby movement of the valve element is controlled; and
a torque motor coupled to the control nozzle, the torque motor further coupled to receive the control commands and configured, in response thereto, to move the control nozzle.

19. The propeller oil control system of claim 14, further comprising:
a check valve disposed between the pump outlet and the regulated oil inlet port, the check valve movable between an open position, in which the regulated oil inlet port is in fluid communication with the pressure regulating valve, and a closed position, in which the regulated oil inlet port is not in fluid communication with the pressure regulating valve; and
a check valve bias spring that supplies a bias force to the check valve that urges the check valve toward the closed position.

20. A propeller oil control system for a turboprop engine of an aircraft, comprising:
an engine control unit operable to determine a flight phase of the aircraft and configured to supply control commands; and a propeller oil controller coupled to receive a supply of oil and discharge the oil at a discharge oil pressure, the propeller oil controller further coupled to receive the control commands from the engine control unit and configured, in response to the control commands, to control the discharge oil pressure, the propeller oil controller comprising:
- a housing including a pump inlet port, a negative torque system supply outlet port, a drain pressure outlet port, and a control pressure outlet port;
- a gerotor oil pump rotationally disposed within the housing, the gerotor pump including a pump inlet and a pump outlet, the gerotor pump adapted to receive a drive torque and configured, upon receipt of the drive torque, to draw oil into the pump inlet and discharge pressurized oil out of the pump outlet at a pump discharge pressure;
- a pressure relief valve disposed between the pump inlet port and the pump outlet, the pressure relief valve configured to place the pump outlet in fluid communication with the pump inlet port when pump discharge pressure reaches a predetermined pressure magnitude;
- a pressure regulating valve disposed within the housing and configured to regulate the pump discharge pressure; and
- an electrohydraulic servo valve coupled to the housing and including at least a regulated oil inlet port, a drain pressure oil outlet port, a valve outlet port, and a null spring, the regulated oil inlet port in fluid communication with the pressure regulating valve to thereby receive the pressurized oil at the regulated pump discharge pressure, the valve outlet port in fluid communication with the control pressure outlet port, the electrohydraulic servo valve further coupled to receive the control commands and configured, in response thereto, to move to (i) a plurality of positions between a first position and a mid-position, and (ii) a plurality of positions between the mid-position and a second position, wherein:
- the null spring applies a force to the valve element that urges the valve element toward the first position,
- in the first position and in the plurality of positions between the first position and the mid-position, the regulated oil inlet port is in fluid communication with the control pressure outlet port via the valve outlet port,
- in the mid-position, the regulated oil inlet port is not in fluid communication with the control pressure outlet port,
- in the second position and in a plurality of positions between the second position and the mid-position, the drain pressure oil outlet port is in fluid communication with the control pressure outlet port, and
- the engine control unit only commands the electrohydraulic servo valve to move out of the first position when the engine control unit determines the aircraft is conducting a take-off roll or the aircraft is in flight.

\* \* \* \* \*